United States Patent
Taylor et al.

(10) Patent No.: US 9,540,028 B2
(45) Date of Patent: Jan. 10, 2017

(54) INFANT STROLLER APPARATUS

(71) Applicant: Wonderland Nurserygoods Company Limited, Kwai Chung (HK)

(72) Inventors: Andrew J. Taylor, Mohnton, PA (US); Curtis M. Hartenstine, Birdsboro, PA (US); Anthony V. Ruggiero, Downington, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 0 days.

(21) Appl. No.: 14/682,434

(22) Filed: Apr. 9, 2015

(65) Prior Publication Data
US 2015/0291200 A1  Oct. 15, 2015

Related U.S. Application Data

(60) Provisional application No. 61/995,441, filed on Apr. 10, 2014.

(51) Int. Cl.
*B62B 9/00* (2006.01)
*B62B 7/10* (2006.01)
(Continued)

(52) U.S. Cl.
CPC .............. *B62B 9/00* (2013.01); *B62B 3/022* (2013.01); *B62B 7/10* (2013.01); *B62B 9/26* (2013.01); *A47C 7/62* (2013.01); *A47C 7/68* (2013.01)

(58) Field of Classification Search
CPC .............. A62B 7/10; A62B 9/26; A62B 3/022
See application file for complete search history.

(56) References Cited

U.S. PATENT DOCUMENTS 887,858 A * 5/1908 Smith .................. B62B 7/10
280/39
3,822,072 A * 7/1974 Jacobs .................. B62B 7/06
280/649
(Continued)

FOREIGN PATENT DOCUMENTS

CN    204055895 U   12/2014
WO    2006031111 A2  3/2006
WO    2012027795 A1  3/2012

OTHER PUBLICATIONS

Search and Examination report from co-pending UK Patent Application No. GB1506002.3 dated Sep. 25, 2015.

*Primary Examiner* — J. Allen Shriver, II
*Assistant Examiner* — Brian Cassidy
(74) *Attorney, Agent, or Firm* — Baker & McKenzie LLP; David I. Roche

(57) ABSTRACT

An infant stroller apparatus includes a first and a second leg segment, a handle segment and a backrest frame. The first and second leg segments are respectively affixed with a first and a second coupling member that are connected with each other. The handle segment is affixed with a third coupling member that is connected with the first coupling member. The backrest frame is connected with the second leg segment. A latch assembled with the second coupling member is movable to engage with the third coupling member to lock the handle segment and the first and second leg segments in an unfolded state. A release actuator operatively connected with the latch is pivotally connected with the second leg segment adjacent to the pivot axis of the backrest frame. The release actuator is rotatable to cause the latch to disengage from the third coupling member for allowing folding of the infant stroller apparatus.

31 Claims, 14 Drawing Sheets

(51) Int. Cl.
  *B62B 3/02* (2006.01)
  *B62B 9/26* (2006.01)
  *A47C 7/62* (2006.01)
  *A47C 7/68* (2006.01)

(56) References Cited

U.S. PATENT DOCUMENTS

| | | | | |
|---|---|---|---|---|
| 5,823,564 A * | 10/1998 | Kettler | B62B 7/10 | 280/642 |
| 5,938,229 A * | 8/1999 | Chen | B62B 7/06 | 280/47.38 |
| 6,581,957 B1* | 6/2003 | Lan | B62B 9/104 | 280/47.38 |
| 6,715,785 B2* | 4/2004 | Shieh | B62B 3/022 | 280/47.34 |
| 7,523,954 B2* | 4/2009 | Dotsey | B62B 7/08 | 280/47.38 |
| 8,070,179 B2* | 12/2011 | Pike | B62B 7/10 | 280/642 |
| 8,602,442 B2* | 12/2013 | Li | B62B 7/062 | 280/642 |
| 8,651,511 B2* | 2/2014 | Chen | B62B 7/066 | 280/642 |
| 8,668,222 B2* | 3/2014 | Chen | B62B 7/08 | 280/47.38 |
| 8,740,243 B2* | 6/2014 | Li | B62B 7/083 | 280/42 |
| 8,998,243 B2* | 4/2015 | Bost | B62B 7/004 | 280/647 |
| 2008/0061534 A1* | 3/2008 | Chen | B62B 7/08 | 280/647 |
| 2008/0079239 A1* | 4/2008 | Li | B62B 7/10 | 280/642 |
| 2008/0088116 A1* | 4/2008 | Den Boer | B62B 7/062 | 280/650 |
| 2008/0093824 A1* | 4/2008 | Chen | B62B 9/20 | 280/642 |
| 2008/0106070 A1* | 5/2008 | Lan | B62B 7/10 | 280/647 |
| 2012/0074671 A1* | 3/2012 | Chen | B62B 7/066 | 280/642 |
| 2012/0187660 A1* | 7/2012 | Liao | B62B 7/086 | 280/642 |
| 2014/0064829 A1* | 3/2014 | Li | B62B 7/08 | 403/81 |
| 2014/0167393 A1 | 6/2014 | Tsai et al. | | |
| 2014/0334867 A1 | 11/2014 | Su et al. | | |
| 2015/0008659 A1 | 1/2015 | Chang et al. | | |
| 2015/0217792 A1* | 8/2015 | Stiba | B62B 7/08 | 280/650 |

* cited by examiner

INFANT STROLLER APPARATUS

CROSS-REFERENCE TO RELATED APPLICATION(S)

This Patent Application claims priority to U.S. Provisional Patent Application No. 61/995,441 filed on Apr. 10, 2014, which is incorporated herein by reference.

BACKGROUND

1. Field of the Invention

The present invention relates to infant stroller apparatuses.

2. Description of the Related Art

Caregivers usually rely on a stroller apparatus to transport babies and children. A stroller apparatus is typically constructed from a metal frame that comprises the assembly of metal and plastic parts, and a fabric element that connects or wraps around the metal frame. When it is unused, the stroller apparatus can be folded and collapsed for convenient storage or transport. The construction adopted for the folding mechanism of the stroller apparatus plays an important role in the design of the stroller since it has to be safe and convenient to handle in different situations while not affecting the appealing aesthetics of the stroller. For example, certain situations require that the stroller apparatus can stand upright in the collapsed state. Other situations require that the stroller apparatus can be conveniently folded and carried with one hand.

Therefore, there is a need for an infant stroller apparatus that can be convenient to fold, improves the user's experience and address at least the foregoing issues.

SUMMARY

The present application describes an infant stroller apparatus that can be easy to collapse with one hand. In one embodiment, the infant stroller apparatus includes a first and a second leg segment, a handle segment and a backrest frame. The first and second leg segment are respectively affixed with a first and a second coupling member that are pivotally connected with each other. The handle segment is affixed with a third coupling member that is pivotally connected with the first coupling member. The backrest frame is pivotally connected with the second leg segment about a pivot axis. A latch is assembled with the second coupling member, the latch being movable relative to the second coupling member to engage with the third coupling member to lock the handle segment and the first and second leg segments in an unfolded state. A release actuator is pivotally connected with the second leg segment adjacent to the pivot axis of the backrest frame, the release actuator further being operatively connected with the latch. The release actuator is rotatable to cause the latch to disengage from the third coupling member for allowing folding of the handle segment and the first and second leg segments.

In other embodiments, the infant stroller apparatus includes a first and a second leg segment, a handle segment and a backrest frame. The first and second leg segment are respectively affixed with a first and a second coupling member that are pivotally connected with each other about a first pivot axis. The handle segment is affixed with a third coupling member that is pivotally connected with the first coupling member about a second pivot axis. The second coupling member includes two sidewalls and is affixed with a shaft portion. The third coupling member further has a guide slot spaced apart from the second pivot axis, the shaft portion of the second coupling member being guided for relative sliding displacement along the guide slot. A latch is further assembled with the second coupling member, the latch and the first and third coupling members being received at least partially in a gap between the two sidewalls of the second coupling member. The latch is movable relative to the second coupling member to engage with the third coupling member to lock the handle segment and the first and second leg segments in an unfolded state.

In still another embodiment, the infant stroller apparatus includes a first and a second leg segment, a handle segment, a backrest frame, a first and a second latch, and a release actuator. The first and second leg segments are respectively affixed with a first and a second coupling member, the first and second coupling members being pivotally connected with each other. The handle segment is affixed with a third coupling member that is pivotally connected with the first coupling member. The backrest frame is pivotally connected with the second leg segment. The first latch is assembled with the second coupling member, and is movable to engage with the third coupling member to lock the handle segment and the first and second leg segments in an unfolded state. The second latch is operable to lock the backrest frame with respect to the second leg segment. The release actuator is pivotally connected with the second leg segment, and is rotatable to drive concurrent unlocking displacements of the first and second latches for folding the infant stroller apparatus.

DETAILED DESCRIPTION OF THE EMBODIMENTS

Figure 1:
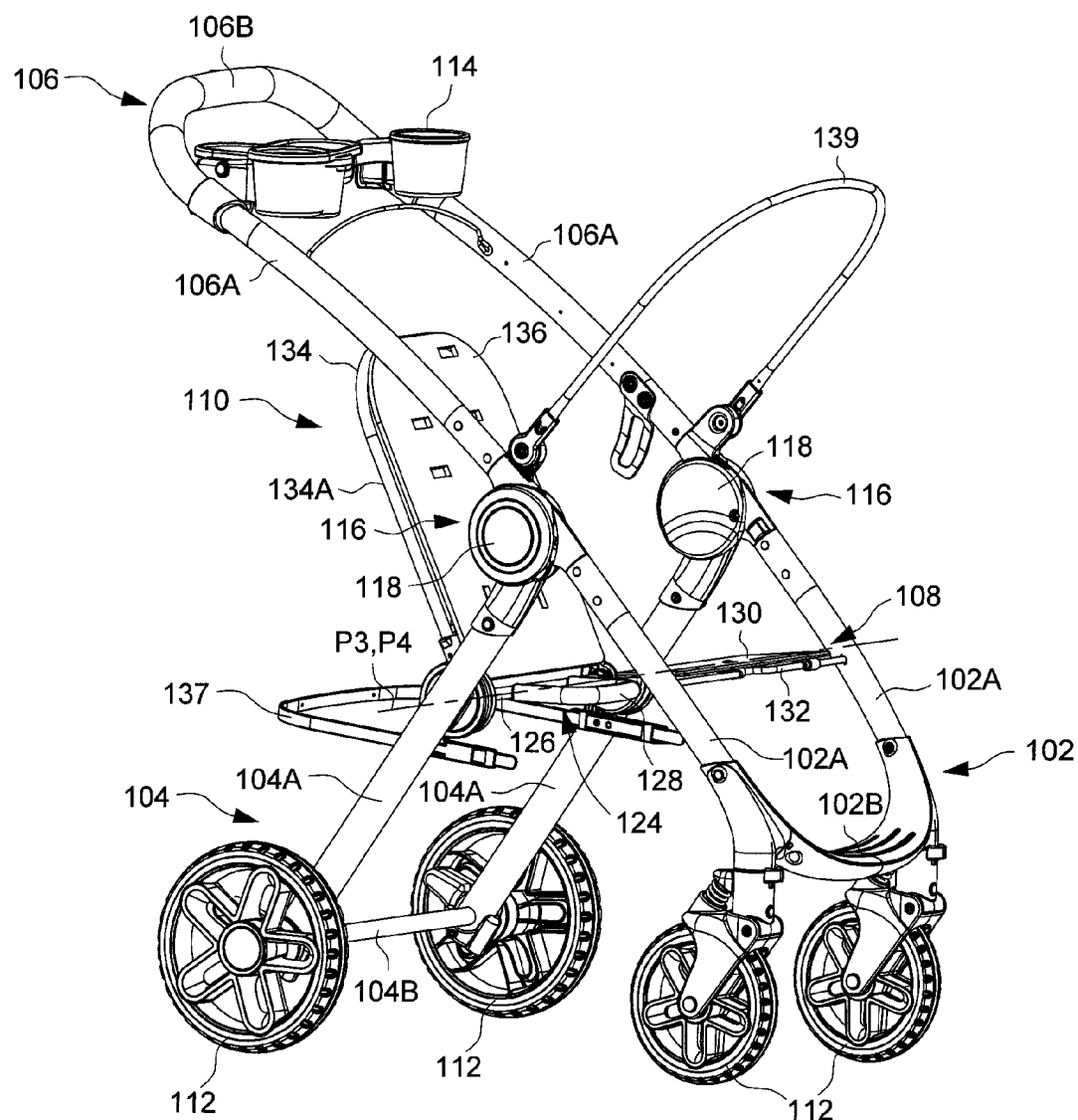
FIG. 1 is a perspective view illustrating an embodiment of an infant stroller apparatus.
Figure 2:
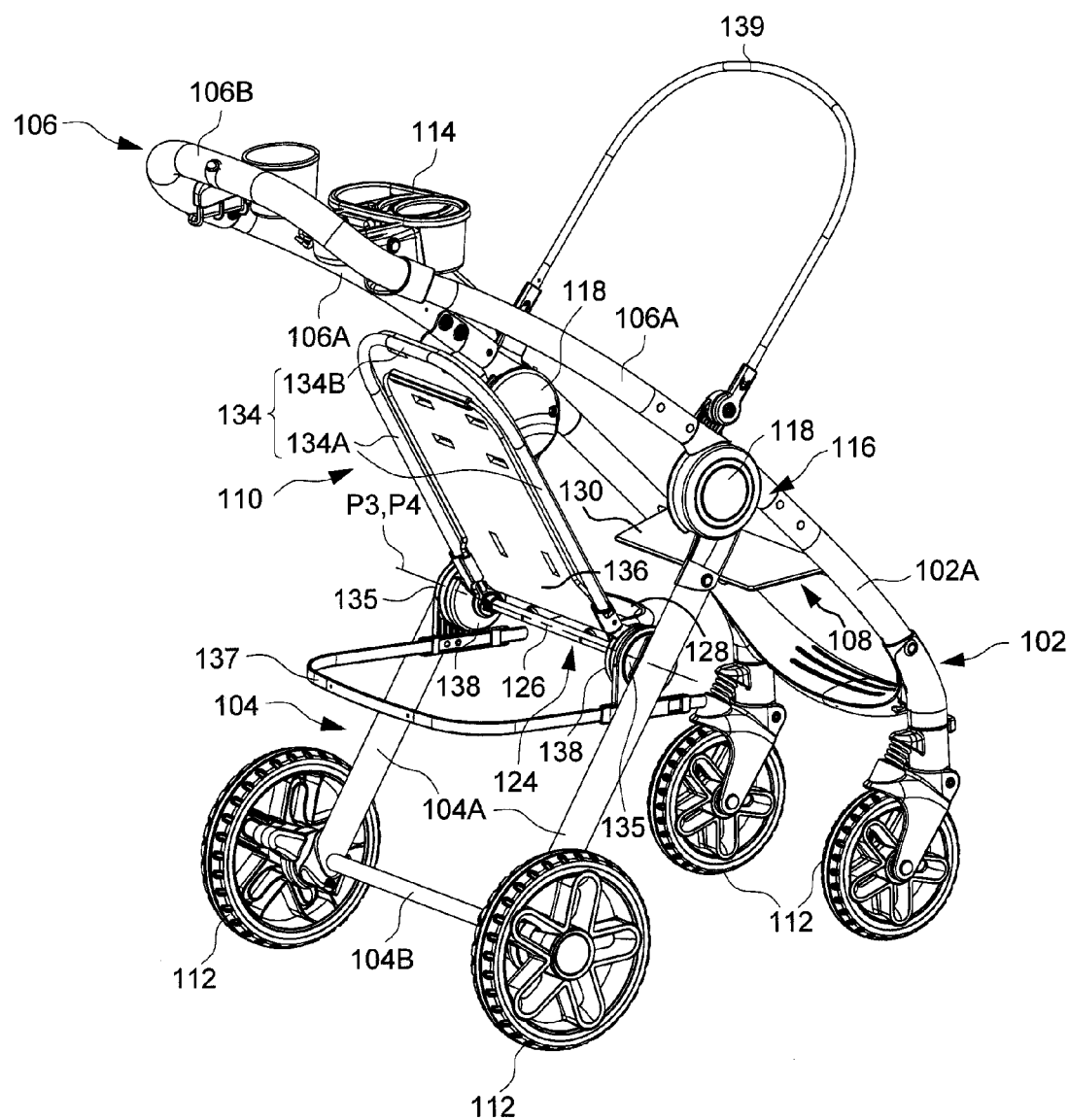
FIG. 2 is another perspective view of the infant stroller apparatus shown in FIG. 1.
Figure 3:
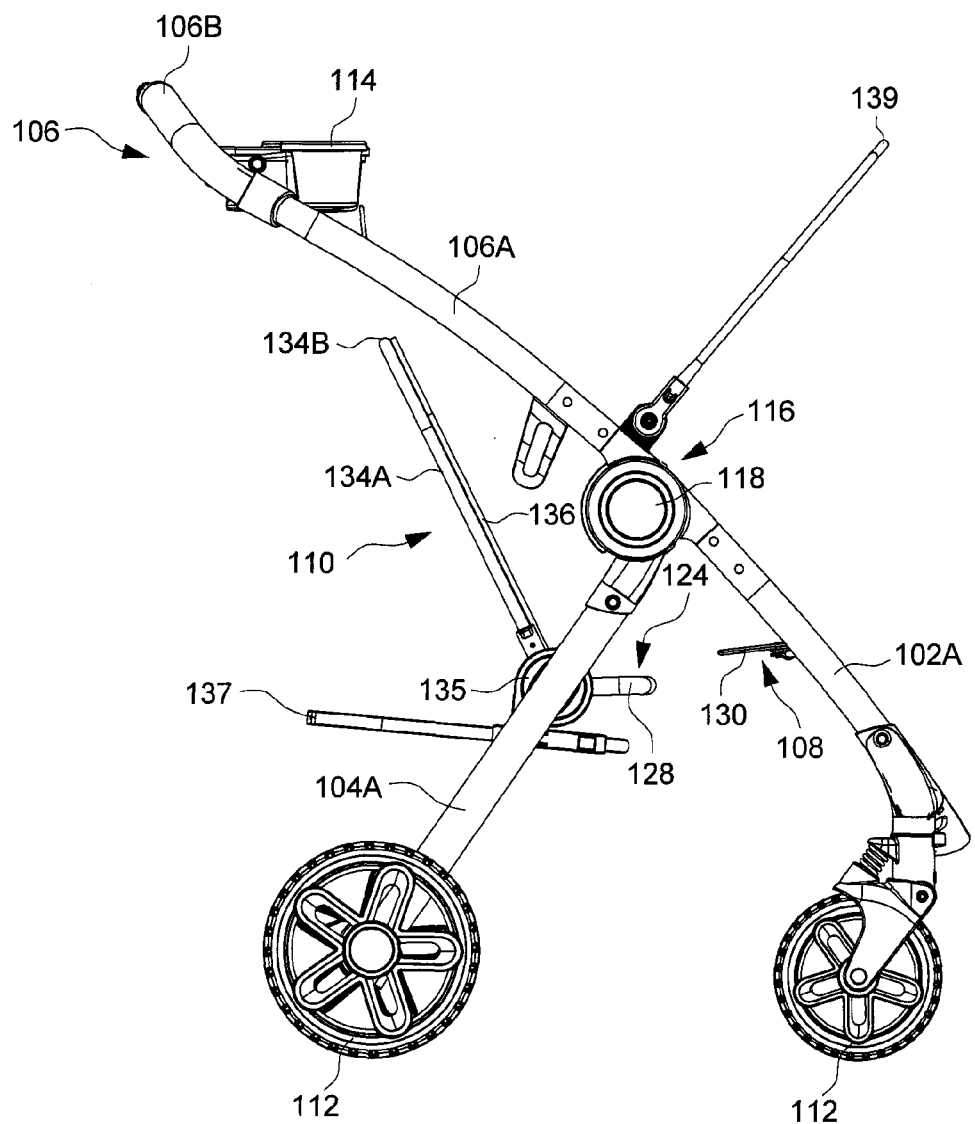
FIG. 3 is a side view of the infant stroller apparatus shown in FIG. 1.

FIGS. 1-3 are various schematic views illustrating an embodiment of an infant stroller apparatus 100. The infant stroller apparatus 100 can include a front leg frame 102, a rear leg frame 104, a handle frame 106, a seat 108 and a backrest 110. The front and rear leg frames 102 and 104 can be respectively formed by the assembly of one or multiple tubular segments. For example, the front leg frame 102 can include two front or first leg segments 102A respectively disposed at a left and a right side of the infant stroller apparatus 100, and a transversal segment 102B connected with the two leg segments 102A. The rear leg frame 104 can include two rear or second leg segments 104A respectively disposed at a left and a right side of the infant stroller apparatus 100, and a transversal segment 104B connected with the two leg segments 104A. The two leg segments 102A of the front leg frame 102 and the two leg segments 104A of the rear leg frame 104 can sideways delimit a central space for assembly of the seat 108 and the backrest 110. Lower end portions of the front and rear leg frames 102 and 104 can be respectively provided with a plurality of wheel assemblies 112.

The handle frame 106 can be formed from the assembly of one or more tubular segments. For example, the handle frame 106 can include two handle segments 106A respectively disposed at a left and a right side of the infant stroller apparatus 100, and a transversal segment 106B connected with the two handle segments 106A. One or more cup holder 114 may be connected with any of the handle segments 106A at an elevated position for the adult's use.

At each of the left and right side of the infant stroller apparatus 100, the respective upper end portions of the leg segments 102A and 104A and the lower end portion of the handle segment 106A can be respectively assembled together via a joint structure 116. The two joint structures 116 can be substantially similar in construction, each of which can be outwardly enclosed with a shell assembly 118.

The joint structures 116 can pivotally assemble the front and rear leg frames 102 and 104 and the handle frame 106, so that they can rotate relative to one another to fold or unfold the infant stroller apparatus 100. Moreover, each of the joint structures 116 can include a latch 122 (better shown in FIG. 6) that is operable to lock the front and rear leg frames 102 and 104 and the handle frame 106 in a deployed or unfolded state for use. As shown in FIGS. 1-3, in the unfolded state, the leg segments 102A of the front leg frame 102 can extend at an angle from the leg segments 104A of the rear leg frame 104 to provide stable standing, while the handle segments 106A can extend upward and rearward from the joint structures 116.

Referring again to FIGS. 1 and 2, for folding the infant stroller apparatus 100, a release actuator 124 can be operated to unlock the joint structures 116. The release actuator 124 can be provided below the seat 108 and can be operatively connected with the latches 122 (better shown in FIG. 6) in the joint structures 116. In one embodiment, the release actuator 124 can include a transversal bar 126 and an operating handle 128. The transversal bar 126 extends from the left to right side of the infant stroller apparatus 100, and is pivotally connected with the leg segments 104A of the rear leg frame 104 about a transversal pivot axis P3 located below the pivot axes P1 and P2. The operating handle 128 can be affixed with the transversal bar 126 at a central location between the left and right side of the infant stroller apparatus 100. The release actuator 124 can be rotated upward about the pivot axis P3 to unlock the two joint structures 116 in a concurrent manner, and then pulled upward with one hand for lifting the entire infant stroller apparatus 100. Under gravity action, the handle frame 106 and the two leg frames 102 and 104 can pivotally fold to collapse the infant stroller apparatus 100. The operative connection between the release actuator 124 and the latches 122 in the joint structures 116 will be described in more details hereinafter with reference to FIGS. 4-7.

Referring again to FIGS. 1-3, the seat 108 can include a seat board 130 that supported on a transversal bar 132 connected with the leg segments 102A of the front leg frame 102. When the infant stroller apparatus 100 is unfolded, the seat 108 can be positioned vertically below the joint structures 116.

The backrest 110 can include a backrest frame 134 and a support board 136 affixed with each other. The backrest frame 134 can be pivotally connected with the leg segments 104A of the rear leg frame 104 about a pivot axis P4 at a location adjacent to the release actuator 124. In one embodiment, the backrest frame 134 can be a unitary body having two side segments 134A, and a transversal segment 134B connected with the two side segments 134A. The two side segments 134A of the backrest frame 134 can be respectively affixed with two coupling shells 138, the two leg segments 104A of the rear leg frame 104 can be respectively affixed with two mount shells 135, and the coupling shells 138 can be respectively connected pivotally with the two mount shells 135 about the pivot axis P4. The backrest 110 is thereby rotatable about the pivot axis P4 for adjustment of its inclination relative to the seat 108.

As shown in FIGS. 1 and 2, the release actuator 124 is pivotally connected with the second leg segments 104A adjacent to the pivot axis P4 of the backrest frame 134. In particular, the release actuator 124 (especially the transversal bar 126) can be assembled through the coupling shells 138 of the backrest frame 134. This allows a compact structure in which the pivot axis P3 of the release actuator 124 can lie adjacent and parallel to the pivot axis P4 of the backrest frame 134. For example, the release actuator 124 and the backrest frame 134 can be arranged such that their pivot axes P3 and P4 are on a common transversal axis extending from the left to the right side (as shown), or are otherwise substantially close and parallel to each other. As further described hereinafter, this arrangement can also provide the ability to unlock the backrest frame 134 with the release actuator 124.

Other components may be provided in the infant stroller apparatus 100 shown in FIGS. 1-3. For example, a basket frame 137 of a generally U-shape may be affixed with the coupling shells 138 and extend rearward. A canopy bow 139 may be affixed with the handle frame 106 close to the joint structures 116.

In conjunction with FIGS. 1-3, FIGS. 4-6 are various schematic views illustrating the construction of the joint structure 116. For clarity, the representation of the shell assembly 118 is omitted in FIGS. 4-6 to better show the inner construction of the joint structure 116. A first coupling member 140 can be affixed with an upper end portion of the leg segment 102A of the front leg frame 102, a second coupling member 142 can be affixed with an upper end portion of the leg segment 104A of the rear leg frame 104, and a third coupling member 144 can be affixed with a distal or lower end portion of the handle segment 106A. The coupling members 140, 142 and 144 can be exemplary made of metal, or like rigid materials.

The first coupling member 140 can include an extension 146, and a plate portion 148 connected with the extension 146. The extension 146 is inserted through the leg segment 102A of the front leg frame 102 and securely affixed therewith, whereas the plate portion 148 is positioned outside the leg segment 102A. The first coupling member 140 can include two spaced-apart holes 150 and 152 formed through the plate portion 148.

The second coupling member 142 can include two plates 154 that are respectively affixed with an interior of the leg segment 104A and have sidewalls 154A positioned outside the leg segment 104A. The two plates 154 can be affixed with the leg segment 104A spaced apart from each other so as to define a gap 155 between the two sidewalls 154A. The two sidewalls 154A can be configured symmetrically across the gap 155, each of which can include two spaced-apart holes 156 and 158 and two spaced-apart guide slots 160 and 162. The order of placement along the length of the plate 154 from its distal end toward the leg segment 104A sequentially includes the hole 156, the hole 158, the guide slot 160 and the guide slot 162. The guide slot 160 can have an arc shape centered on the hole 158, and the guide slot 162 can have a linear elongated shape extending along the length of the plate 154.

It is worth noting that while the second coupling member 142 has been described as the assembly of two plates 154, alternate embodiments may also provide a second coupling member 142 formed as an integral body having the two sidewalls 154A spaced apart from each other as described previously.

The third coupling member 144 can include an extension 164, and a plate portion 166 connected with the extension 164 and having at least partially a rounded contour. The extension 164 can be inserted through the handle segment 106A and securely affixed therewith, whereas the plate portion 166 is located outside the handle segment 106A. The third coupling member 144 can include a hole 168 and a guide slot 170 respectively formed through the plate portion 166, and a notch 172 formed on a peripheral edge of the plate portion 166. The guide slot 170 can generally extend from a periphery of the plate portion 166 toward the hole 168.

Figure 4:
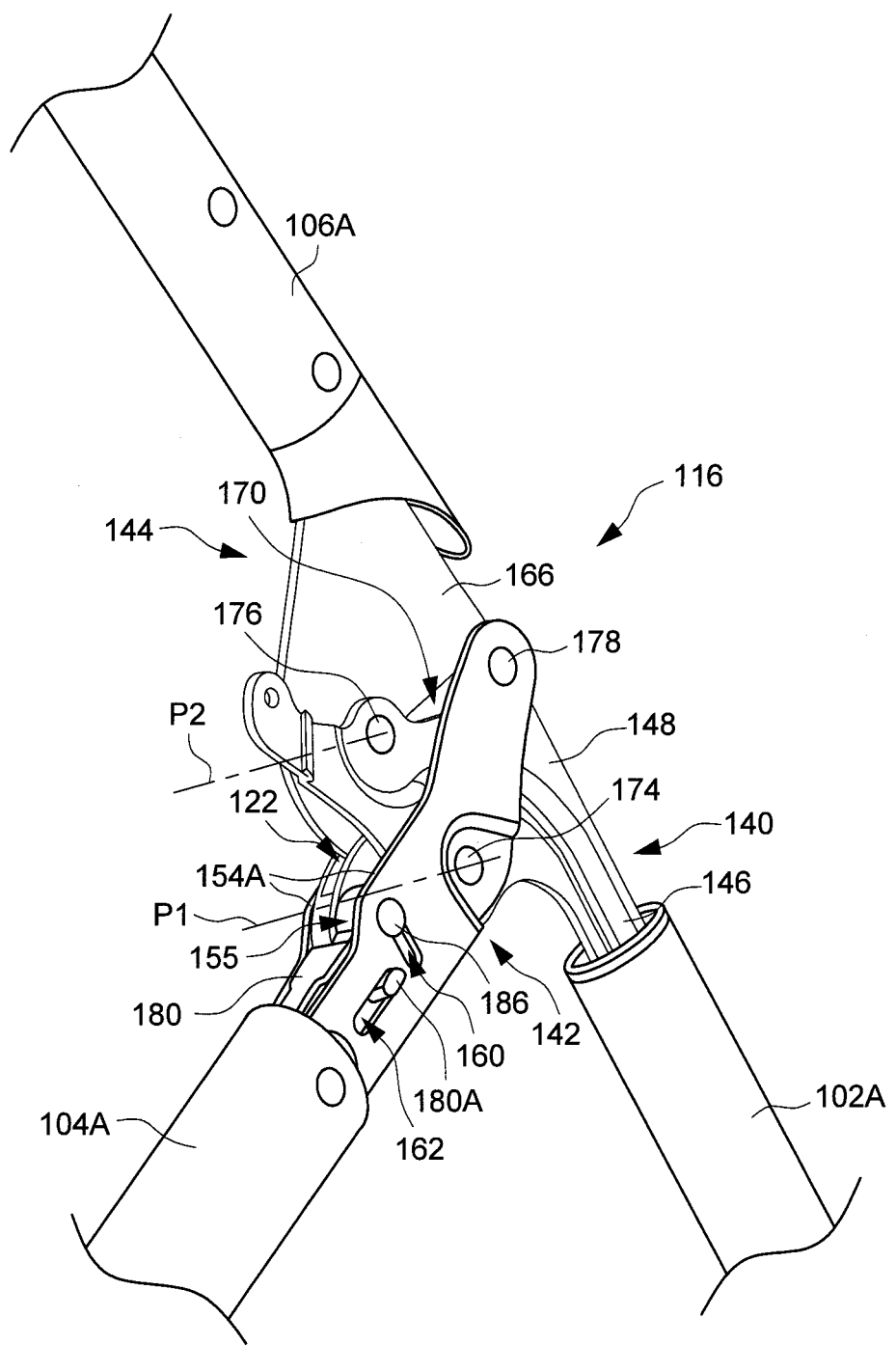
FIG. 4 is a schematic view illustrating a joint structure implemented in the infant stroller apparatus shown in FIG. 1.
Figure 5:
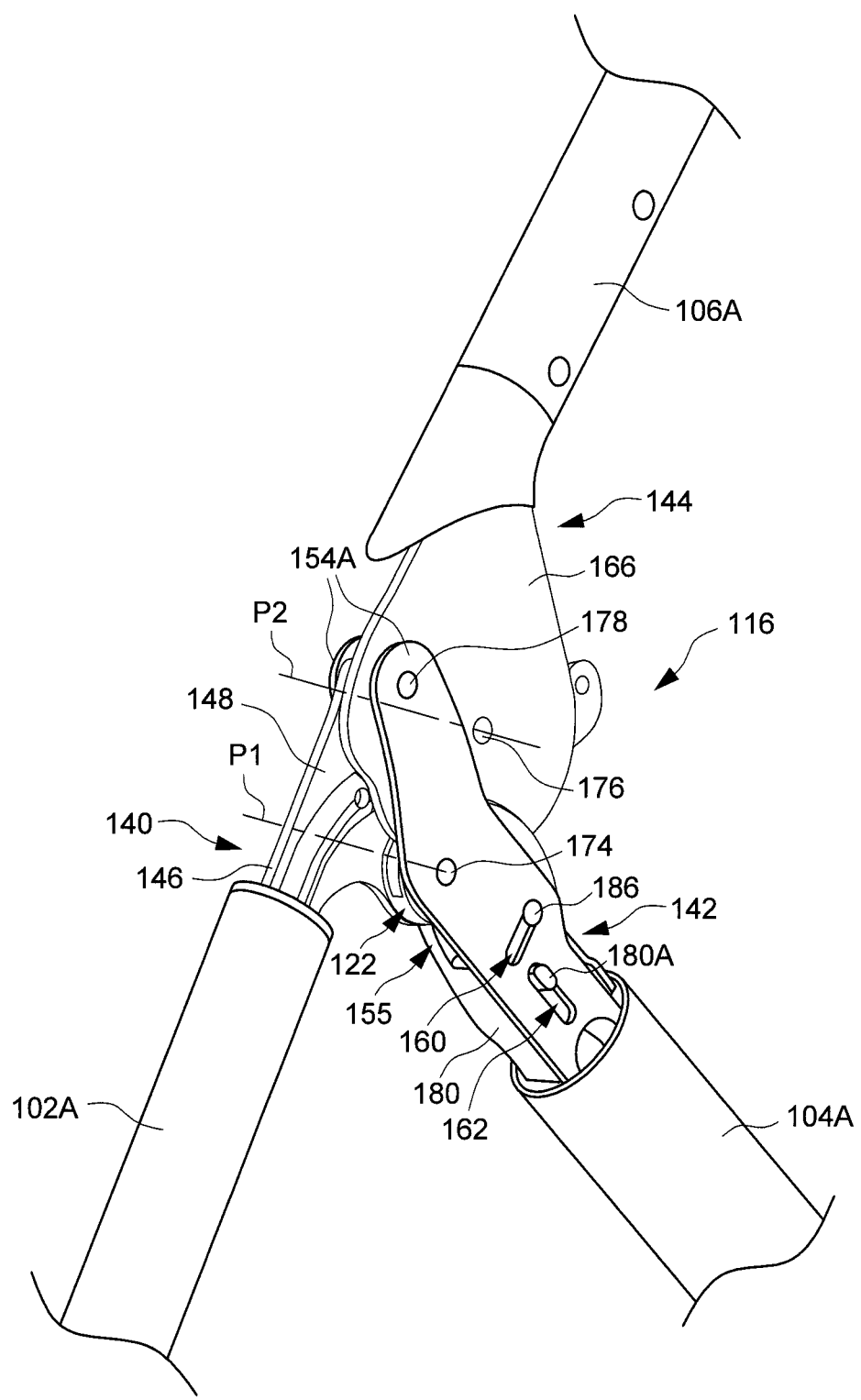
FIG. 5 is a schematic view illustrating the joint structure from another side opposite that of FIG. 4.
Figure 6:
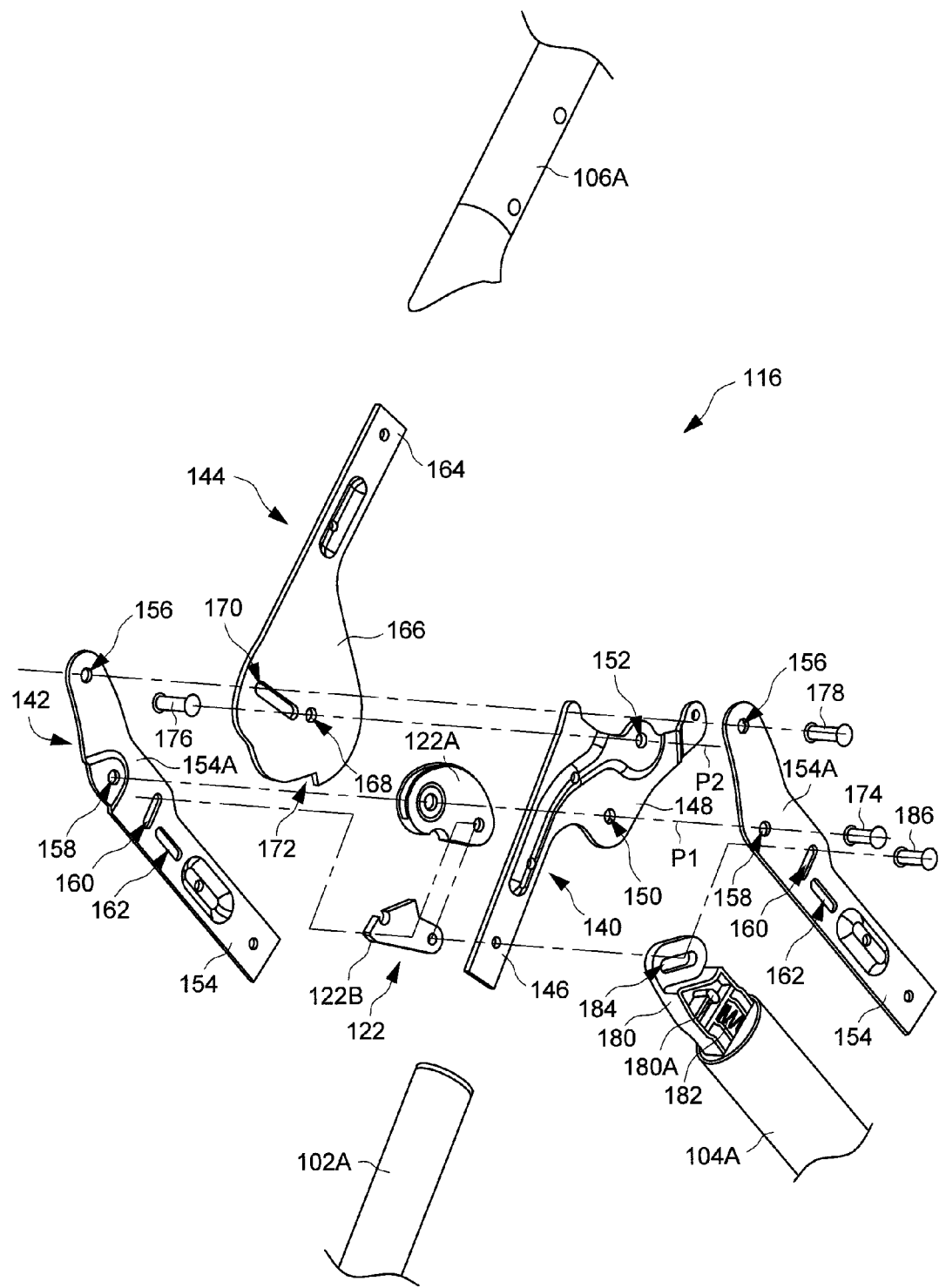
FIG. 6 is an exploded view illustrating the joint structure shown in FIG. 4.
Figure 7:
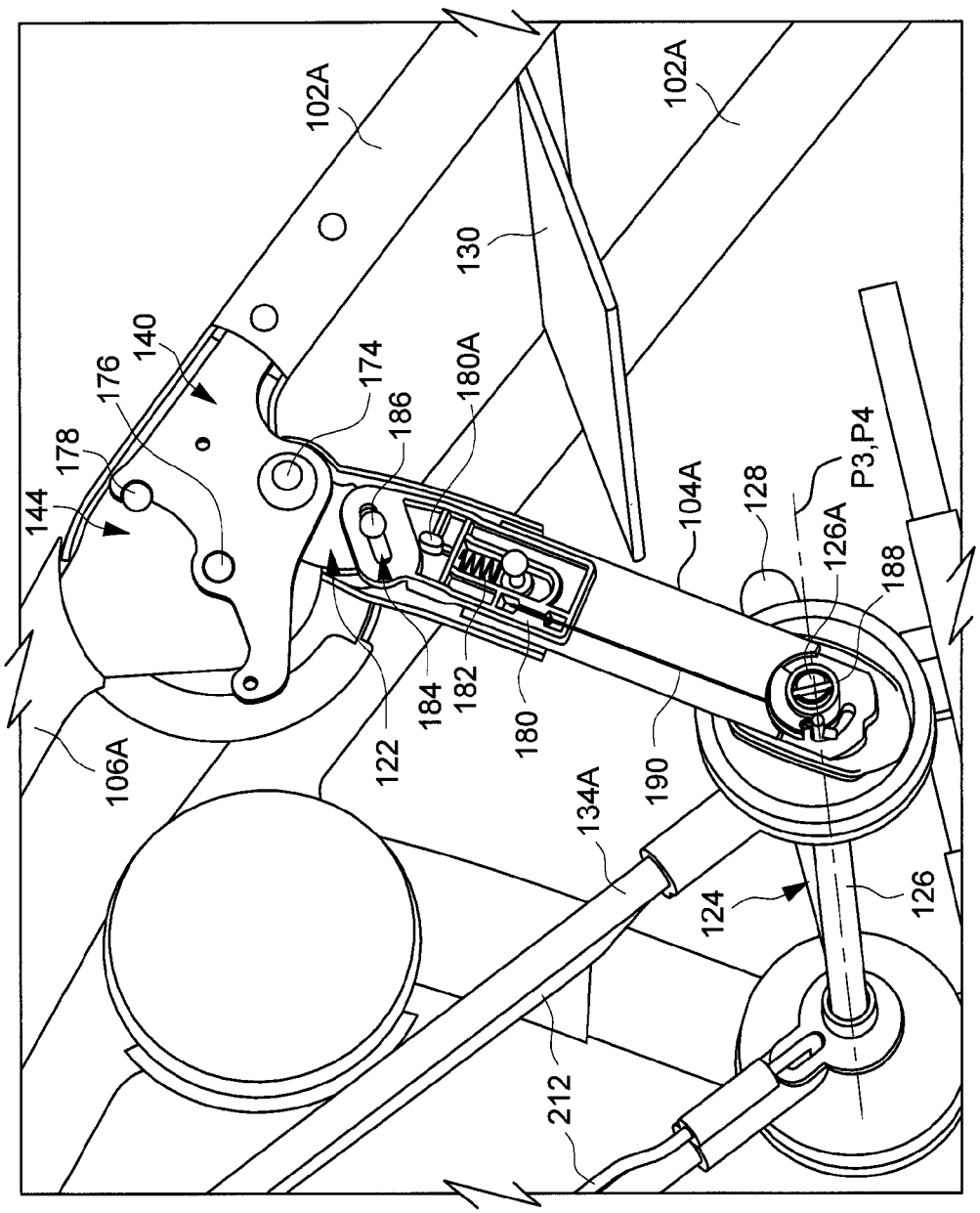
FIG. 7 is a schematic view illustrating the connection of a release actuator with a latch in the joint structure.

Referring to FIGS. 4-6, the first, second and third coupling members 140, 142 and 144 can be assembled adjacent to one another, the first and third coupling members 140 and 144 being received at least partially in the gap 155 between the two sidewalls 154A of the second coupling member 142. A pivot connection 174 (e.g., shaft, pin, rivet and the like) can be assembled through the holes 150 and 158 to pivotally connect the first and second coupling members 140 and 142 about a pivot axis P1. Another pivot connection 176 (e.g., shaft, pin, rivet and the like) can be assembled through the holes 152 and 168 to pivotally connect the first and third coupling element 140 and 144 about another pivot axis P2 spaced from and parallel to the pivot axis P1. Moreover, a shaft portion 178 (e.g., formed by a rivet) affixed with the first coupling member 140 can be movably assembled through the guide slot 170 of the third coupling member 144. When the joint structure 116 is in an unfolded state, the pivot axis P2 is located vertically between the pivot axis P1 and the shaft portion 178, the pivot axis P1 and the shaft portion 178 being respectively below and above the pivot axis P2.

With the aforementioned assembly, the front and rear leg frames 102 and 104 can be pivotally connected together via the pivot connection 174 and rotate relative to each other about the pivot axis P1, whereas the front leg frame 102 and the handle frame 106 can be pivotally connected together via the pivot connection 176 and rotate relative to each other about the pivot axis P2. Owing to the placement of the guide slot 170 spaced apart from the pivot axis P2 and the shaft portion 178 being guided for relative sliding displacement along the guide slot 170, the rotational displacements of the rear leg frame 104 and the handle frame 106 can be linked with each other. In other words, a rotational displacement of the handle frame 106 can drive rotational displacement of the rear leg frame 104, and reciprocally. This construction can facilitate parallel displacements of the handle frame 106 and the front and rear leg frame 102 and 104 to fold and unfold the infant stroller apparatus 100.

Referring again to FIGS. 4-6, the two joint structure 116 can further include a lock mechanism comprised of a latch 122, a driving part 180 and a spring 182. This lock mechanism can be similar in the two joint structures 116 provided at the left and right side of the infant stroller apparatus 100. The latch 122 can be assembled with the second coupling member 142 of the leg segment 104A, and is movable to engage with the notch 172 of the third coupling member 144 to lock the handle segment 106A and the two leg segments 102A and 104A in an unfolded state. In one embodiment, the latch 122 may include a cover 122A, and an inner plate 122B fixedly attached in the cover 122A. The latch 122 can be pivotally connected with the second coupling member 142 about the pivot axis P1 by having the pivot connection 174 passing through a hole of the latch 122. The latch 122, including the cover 122A and the inner plate 122B, can be received at least partially in the gap 155 between the two sidewalls 154A of the second coupling member 142. More specifically, the latch 122 and the third coupling member 144 can be received at least partially in a space delimited between the first coupling member 140 and one of the two sidewalls 154A.

The driving part 180 can be formed as a unitary body arranged in the gap 155 between the two sidewalls 154A of the second coupling member 142, and can be assembled for sliding movement along the length of the leg segment 104A of the rear leg frame 104. For facilitating this sliding displacement, one or two sides of the driving part 180 can be exemplary provided with a protrusion 180A that is guided for sliding displacement along the guide slot 162 of the second coupling member 142. An end portion of the driving part 180 located adjacent to the latch 122 can further include a guide slot 184 that is inclined an angle relative to the sliding axis of the driving part 180. A shaft portion 186 (e.g., formed by a pin or rivet) affixed with the latch 122 can be movably assembled through the guide slot 184 of the driving part 180 for connecting the latch 122 with the driving part 180, the shaft portion 186 being further guided for sliding displacement along the guide slots 160 of the second coupling member 142. With this assembly, the driving part 180 can slide relative to the second coupling member 142 toward the pivot axis P1 to drive rotation of the latch 122 in one direction for engaging with the third coupling member 144, and slide away from the pivot axis P1 to drive rotation of the latch 122 in an opposite direction for disengaging from the third coupling member 144.

The spring 182 can have two ends respectively connected with the driving part 180 and a fixed point on the second coupling member 142 or leg segment 104A. The spring 182 can bias the driving part 180 toward the pivot axis P1 for causing the latch 122 to engage with the third coupling member 144.

In conjunction with FIGS. 4-6, FIG. 7 is a schematic view illustrating the connection of the driving part 180 with the release actuator 124. For clarity, one of the two plates 154 of the second coupling member 142 is omitted in FIG. 7. As previously described, the release actuator 124 can include a transversal bar 126 and an operating handle 128 affixed with each other. An end 126A of the transversal bar 126 can be pivotally connected with one corresponding leg segment 104A about the pivot axis P3, and can be affixed with a hub portion 188 inside the leg segment 104A. A wire 190 can be routed along the interior of the leg segment 104A, and can have two ends respectively connected with the hub portion 188 and the driving part 180. Likewise, the other end 126A of the transversal bar 126 can be pivotally connected with the other leg segment 104A and coupled with another wire 190 that connects to the other driving part 180. Examples of the wires 190 may include, without limitation, metallic cables, flexible cords or ropes, plastic strips, etc. The release actuator 124 thereby can be respectively coupled with the two driving parts 180 via two wires 190, and is operable to cause the two latches 122 to respectively disengage from the two third coupling members 144 in a concurrently manner for allowing folding of the handle frame 106 and the front and rear leg segments 102 and 104.

In conjunction with FIGS. 4-7, FIGS. 8-11 are various schematic views illustrating a recline adjustment mechanism provided at each of a left and a right side of the backrest frame 134 adjacent to the release actuator 124. The recline adjustment mechanism is arranged adjacent to the coupling shell 138 and the mount shell 135 at each of the left and right side of the backrest frame 134. The recline adjustment mechanism can include a latch 202, a spring 204 and a release actuator 206. The transversal bar 126 of the release actuator 124 can be respectively assembled through the coupling shell 138 and the mount shell 135 so as to pivotally support the backrest frame 134. The latch 202 can be arranged in an inner cavity 207 enclosed by the coupling shell 138 and the mount shell 135, and can be assembled for sliding movement along the transversal bar 126, which also defines the pivot axis P4 of the backrest frame 134 (i.e., the pivot axis P3 of the release actuator 124 and the pivot axis P4 of the backrest frame 134 are aligned with each other). The latch 202 can have a peripheral edge of a circular shape provided with a plurality of teeth 202A, and a conical ramped surface 202B facing the coupling shell 138 and having an axis aligned with the pivot axis P4. The latch 202 can slide transversally along the transversal bar 126 relative to the backrest frame 134 between a locking position for locking the backrest frame 134 in place with respect to the rear leg frame 104, and an unlocking position for allowing rotation of the backrest frame 134 about the transversal bar 126 relative to the rear leg frame 104. In the locking position, the teeth 202A of the latch 202 can respectively engage with a plurality of teeth 138A of the coupling shell 138 and a plurality of teeth 135A of the mount shell 135. In the unlocking position, the teeth 202A of the latch 202A are disengaged from the teeth 138A of the coupling shell 138, so that the coupling shell 138 is rotatable relative to the mount shell 135.

The spring 204 can be arranged between the mount shell 135 and the latch 202, and can bias the latch 202 to the locking position engaging with the coupling shell 138.

Figure 11:
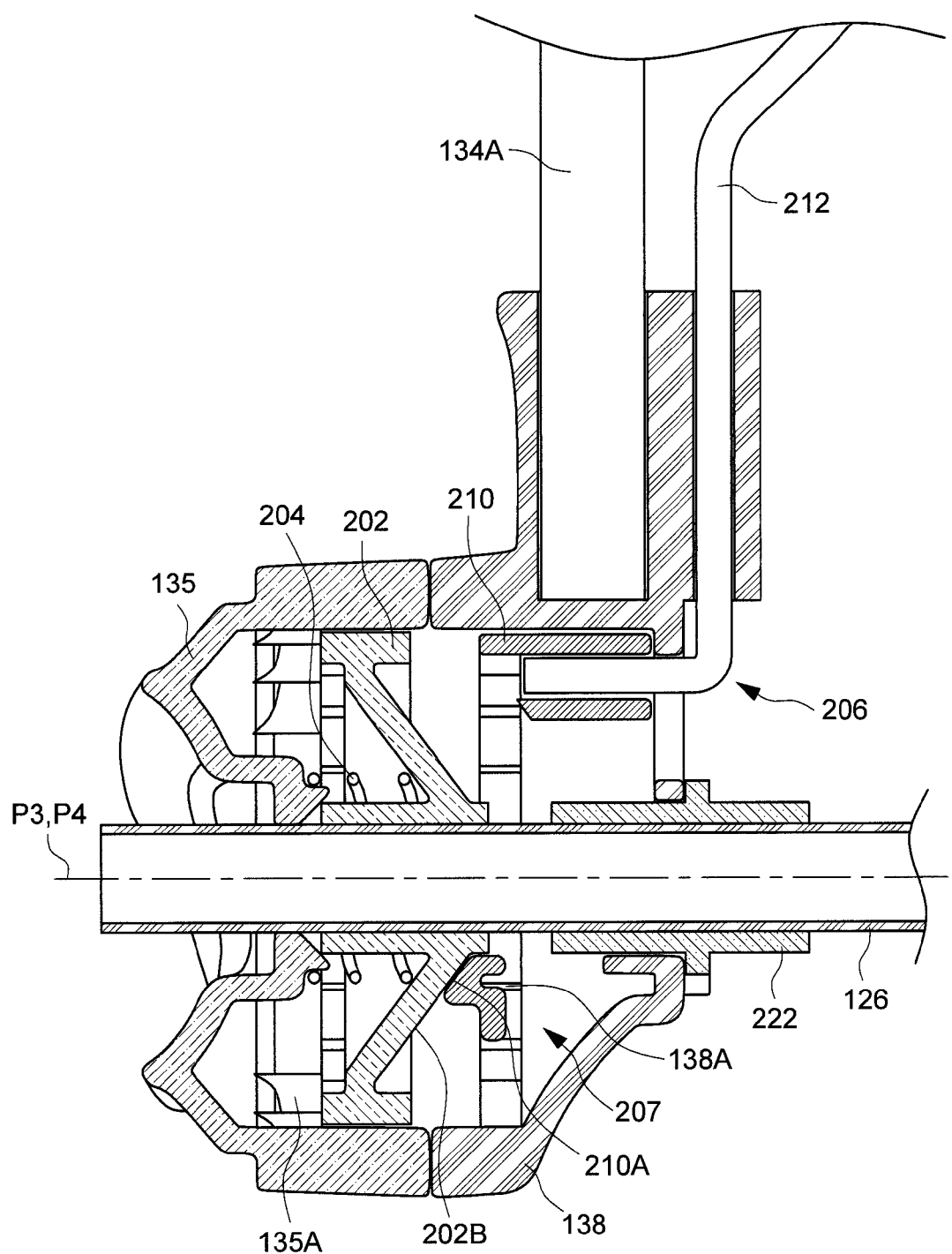
FIG. 11 is a cross-sectional view illustrating the recline adjustment mechanism in an unlocking state.

The release actuator 206 can be operable independently from the release actuator 124 to drive the latch 202 to move from the locking position to the unlocking position. In one embodiment, the release actuator 206 can include a pushing part 210 and a rod 212 affixed with each other. The pushing part 210 can be arranged for sliding movement in the inner cavity 207 in a plane substantially perpendicular to the pivot axis P4, and can have a ramped surface 210A in sliding contact with the ramped surface 202B of the latch 202. The rod 212 can extend outside the inner cavity 207 and along a corresponding side segment 134A of the backrest frame 134. The release actuator 206, including the pushing part 210 and the rod 212, can slide along an axis that is generally parallel to the side segment 134A of the backrest frame 134. Referring to FIG. 11, as the release actuator 206 is pulled upward, the ramped surface 210A of the pushing part 210 can push against the ramped surface 202B of the latch 202, which causes the latch 202 to slide along the transversal bar 126 to the unlocking position for allowing pivotal adjustment of the backrest frame 134.

For facilitating folding of the infant stroller apparatus 100, it may be desirable to allow free rotation of the backrest frame 134 during collapse of the handle frame 106 and the front and rear leg frames 102 and 104. In this regard, the release actuator 124 can be configured to drive an unlocking displacement of the latch 202 concurrently to the unlocking displacement of the latch 122 in each joint structure 116. Exemplary construction for allowing the release actuator 124 to drive the latch 202 at each of the left and right side of the backrest frame 134 is exemplary shown in FIGS. 9 and 12.

Figure 9:
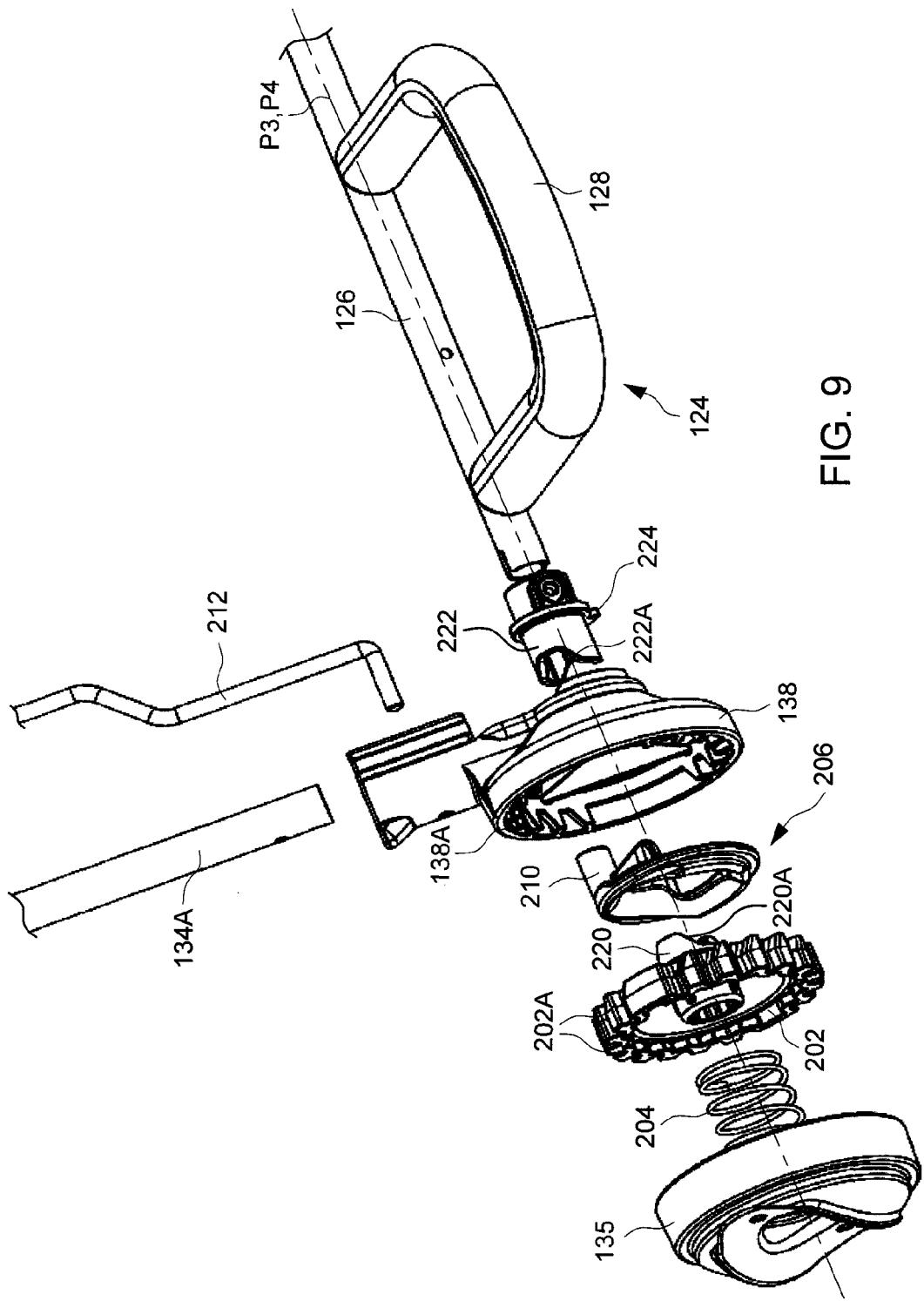
FIG. 9 is an exploded view illustrating the assembly of the recline adjustment mechanism with a release actuator that is used for unlocking the joint structure shown in FIG. 4.
Figure 10:
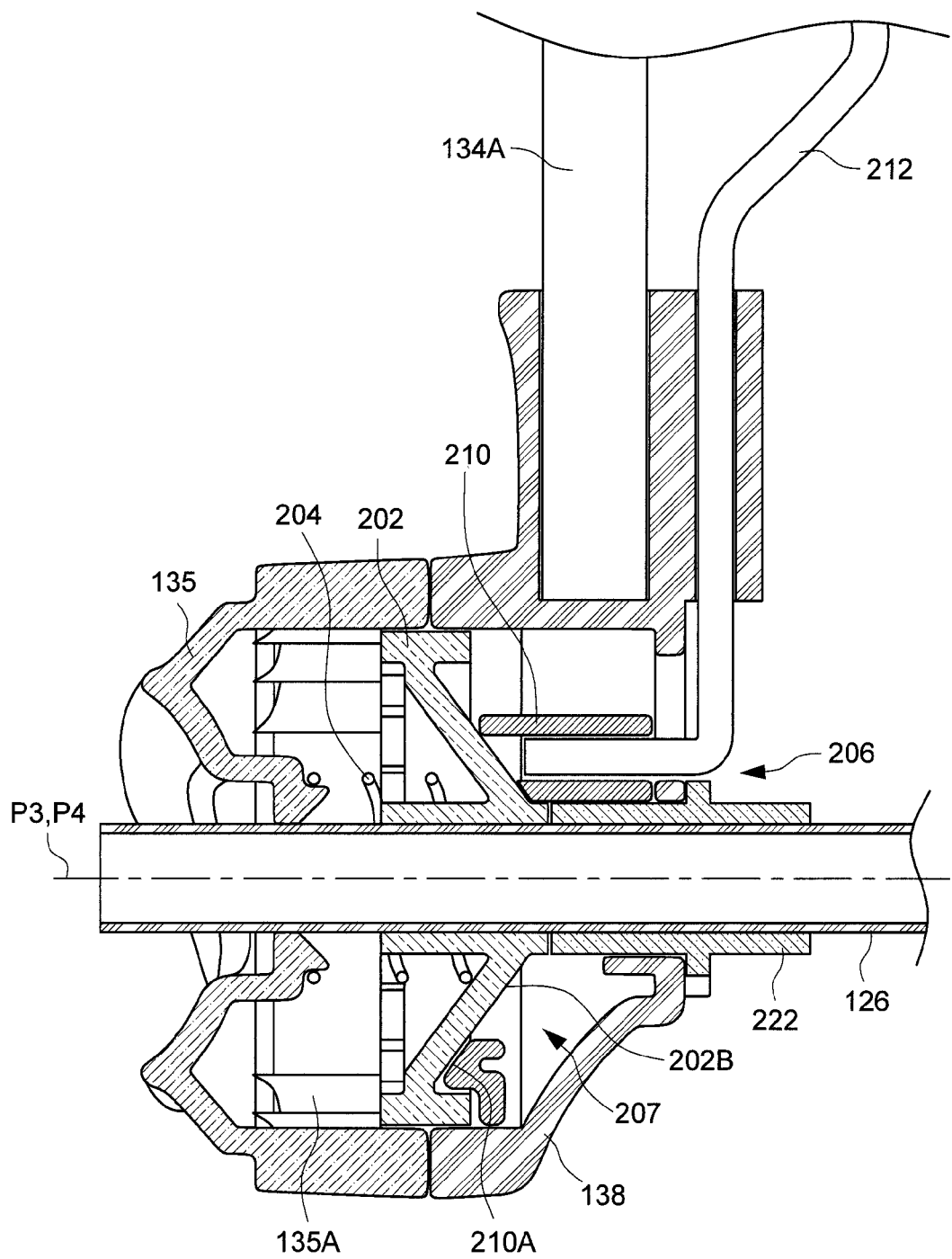
FIG. 10 is a cross-sectional view illustrating the recline adjustment mechanism of the backrest frame in a locking state.
Figure 12:
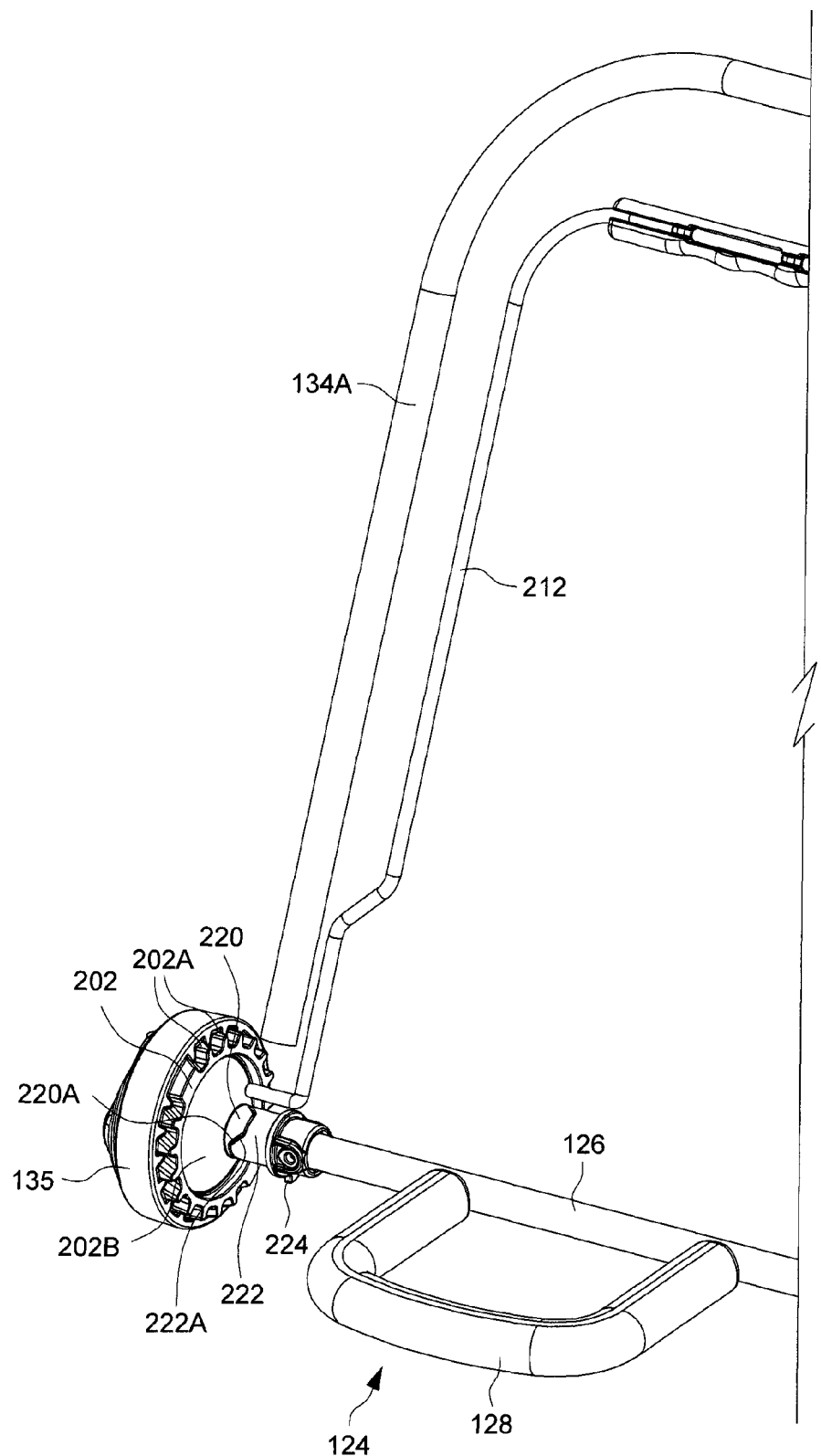
FIG. 12 is a schematic view illustrating a connection of the release actuator with a latch used in the recline adjustment mechanism.

For clarity, the representation of the coupling shell 138 affixed with the backrest frame 134 is omitted in FIG. 12. Referring to FIGS. 9 and 12, the latch 202 can be affixed with a protruding portion 220 projecting sideways from the ramped surface 202B. The projecting portion 220 can have a ramped surface 220A, and can be exemplary formed integrally with the latch 202. The transversal bar 126 of the release actuator 124 can be affixed with a driving portion 222 that is arranged adjacent to the latch 202. In one embodiment, the driving portion 222 can be formed as a collar around the transversal bar 126. The driving portion 222 may be affixed with the transversal bar 126 as a separate part (as shown), or formed integrally with the transversal bar 126. The driving portion 222 can be arranged at the same side as the pushing part 210 with respect to the latch 202, and can have a ramped surface 222A in sliding contact with the ramp surface 220A on the protruding portion 220 of the latch 202. While the release actuator 124 is rotated to unlock the latch 122 in each joint structure 116 as described previously, the driving portion 222 can rotate with the release actuator 124 and push the latch 202 to disengage from the coupling shell 138 for unlocking the backrest frame 134. Accordingly, the release actuator 124 is rotatable to drive concurrent unlocking displacements of the latches 122 and 202 for folding the infant stroller apparatus 100.

Figure 13:
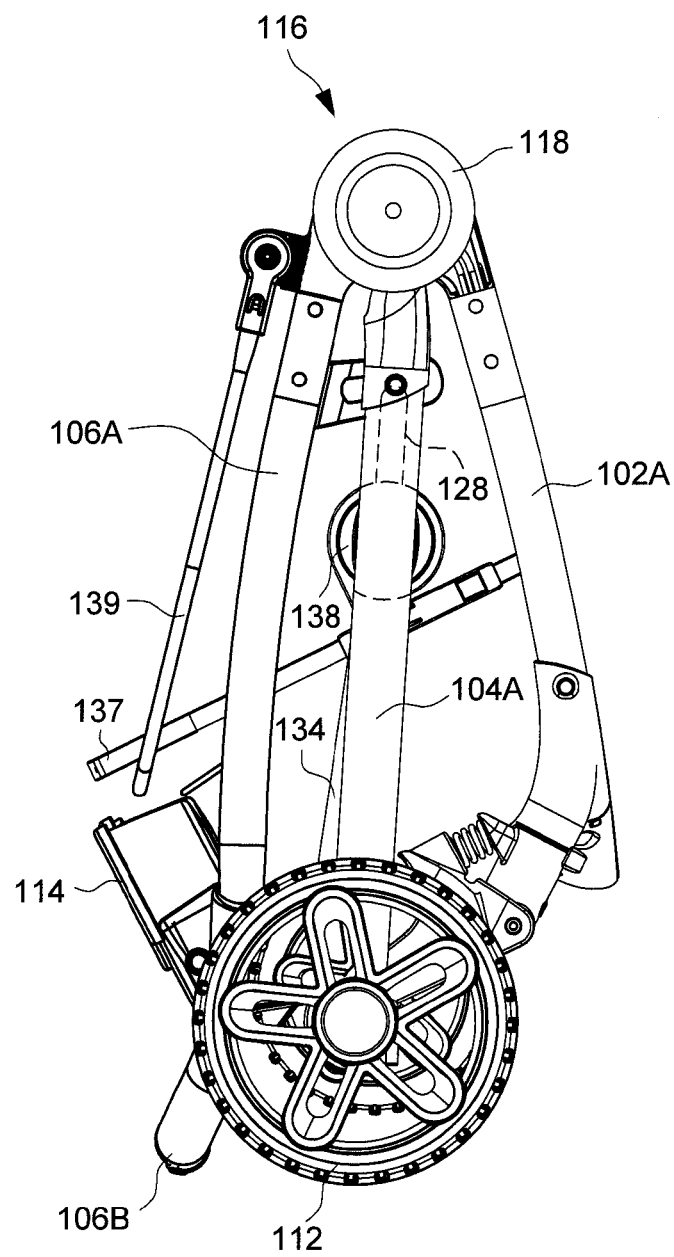
FIG. 13 is a schematic view illustrating the infant stroller apparatus in a folded state.

Exemplary operating for folding the infant stroller apparatus 100 is described hereinafter with reference to FIGS. 1-13, wherein FIG. 13 is a schematic view illustrating the infant stroller apparatus 100 in a collapsed or folded state. Referring to FIGS. 1-10, when the infant stroller apparatus 100 is in the unfolded state for use, the release actuator 124 is in a first position where the operating handle 128 lies close to a horizontal plane. In each joint structure 116, the biasing action applied by the spring 182 can urge the latch 122 to engage with the third coupling member 144. Moreover, the spring 204 can urge the latch 202 to the locking position for engaging with the coupling shell 138 and the mounting shell 140 in the recline adjustment mechanism provided at each of the left and right side of the backrest frame 134.

For adjusting the inclination of the backrest frame 134, the release actuator 206 can be pulled upward, which causes the latch 202 to move along the transversal bar 126 to the unlocking position disengaging from the coupling shell 138. While the release actuator 206 is operated, the release actuator 124 can remain stationary. Once the backrest frame 134 is in the desired position, the release actuator 206 is released, and the spring 204 can urge the latch 202 to the locking position.

For collapsing the infant stroller apparatus 100, the release actuator 124 is rotated upward from the first position described previously to a second position where the operating handle 128 rises upright as shown with phantom lines in FIG. 13. As a result, the hub portions 188 can respectively pull on the two wires 190, which in turn urge the two driving parts 180 to slide downward away from the pivot axis P1 against the biasing action of the springs 182 for causing the two latches 122 to respectively disengage from the third coupling members 144. In the meantime, the driving portion 222 can also rotate with the release actuator 124 and push the latch 202 to disengage from the coupling shell 138 for unlocking the backrest frame 134. In this manner, the joint structures 116 and the recline adjustment mechanisms can be unlocked concurrently to allow folding of the handle frame 108 and the front and rear leg frames 102 and 104 and free rotation of the backrest frame 134. A caregiver then can use one hand to gasp the operating handle 128 and lift the entire infant stroller apparatus 100 above a floor surface, which results in folding and collapse of the handle frame 108, the front and rear leg frames 102 and 104 and the backrest frame 134 by gravity action.

Figure 8:
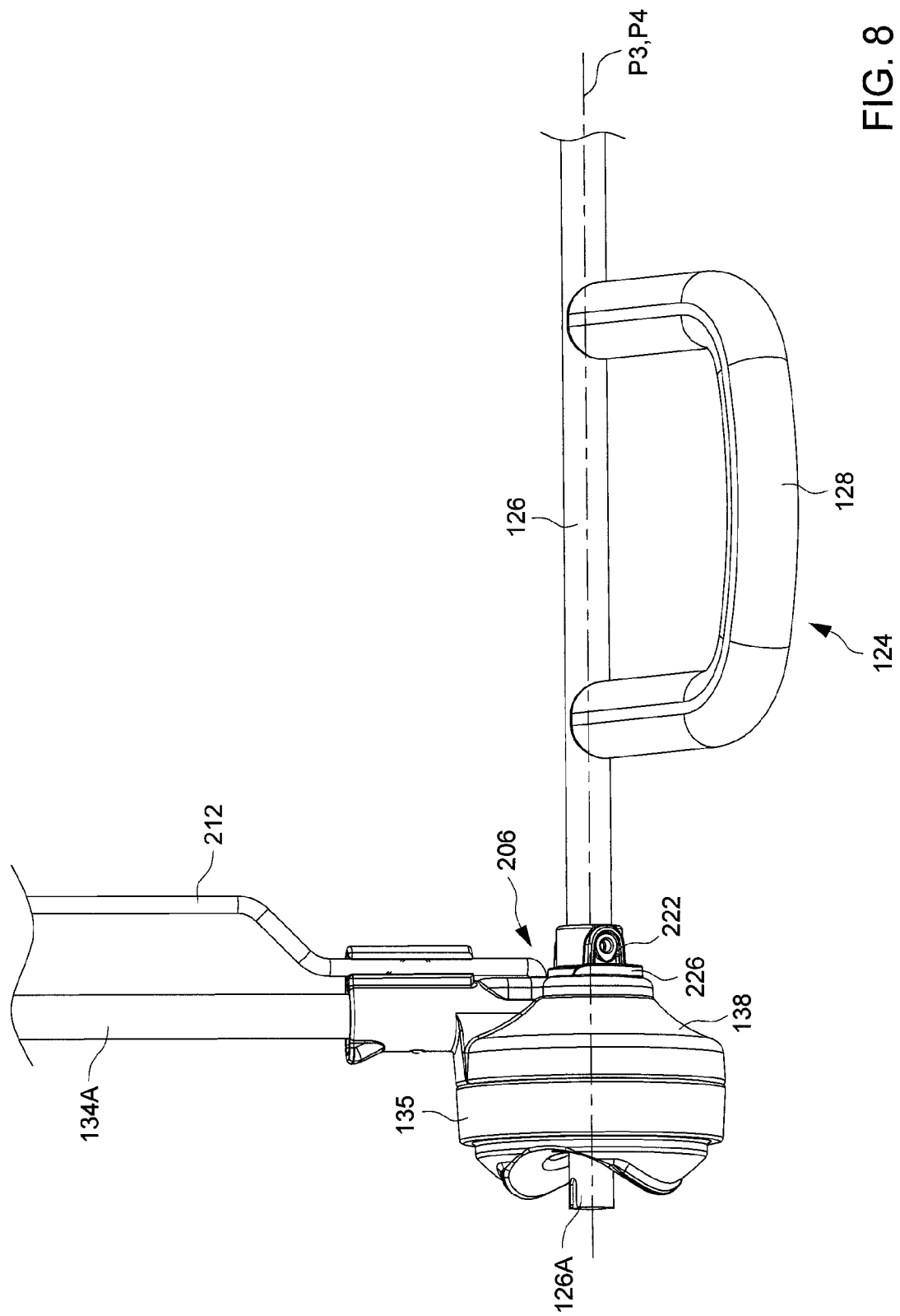
FIG. 8 is a schematic view illustrating a portion of the backrest frame provided with a recline adjustment mechanism.
Figure 14:
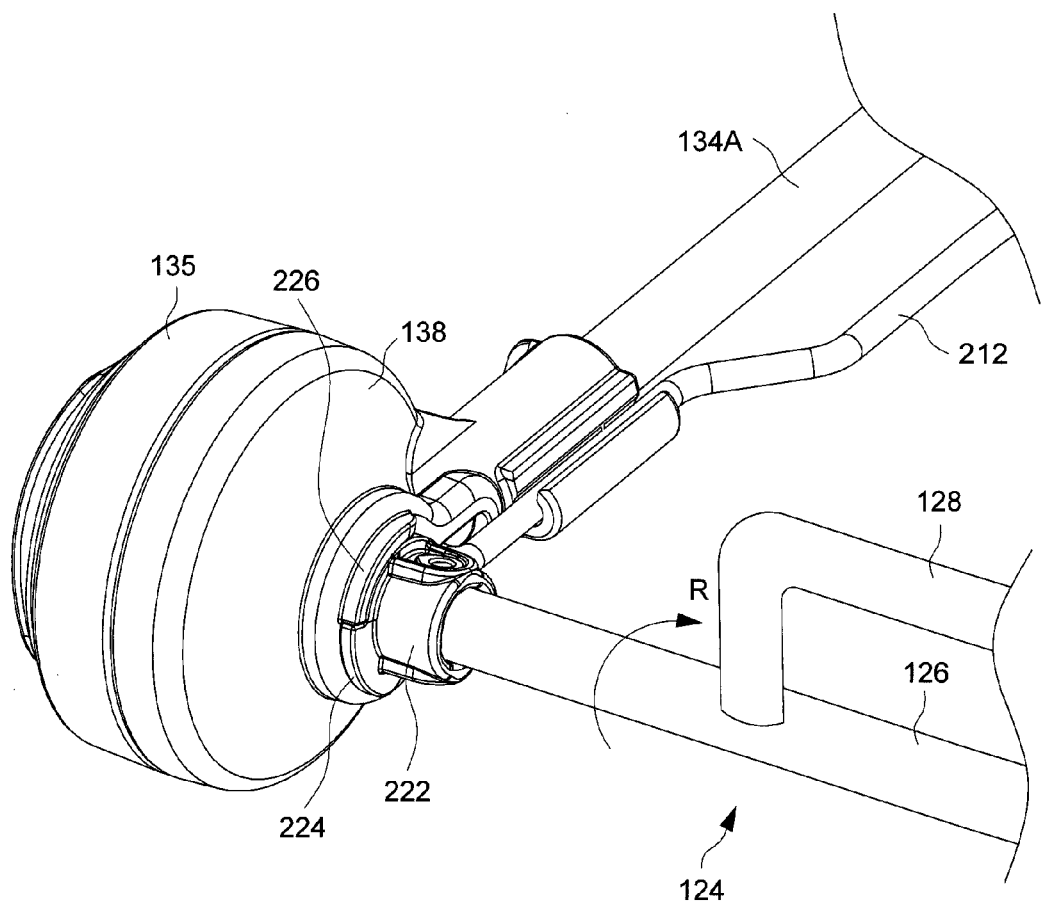
FIG. 14 is a schematic enlarged view illustrating a further structural detail provided on the release actuator for applying an initial push to the backrest frame during collapse of the infant stroller apparatus.

In some embodiments, the release actuator 124 may further have a structure for applying an initial push to the unlocked backrest frame 134 so as to initiate its folding displacement during collapse of the infant stroller apparatus 100. In conjunction with FIGS. 8 and 9, FIG. 14 is a schematic enlarged view illustrating a further structural detail of the driving portion 222 that can interact with the coupling shell 138 for applying the aforementioned push. The driving portion 222 can have a protruding rib 224 located adjacent to the coupling shell 138, the rib 224 rotating in unison with the driving portion 222 and the release actuator 124. As the driving portion 222 rotates with the transversal bar 126 of the release actuator 124 in the direction R (i.e., in the direction rising the operating handle 128) to unlock the backrest frame 134, the rib 224 can contact and push against a rib 226 affixed with the coupling shell 138. The contact between the ribs 224 and 226 can occur approximately at the same as the unlocking of the backrest frame 134, or after the backrest frame 134 is unlocked. This initial push applied to the backrest frame 134 can initiate a rearward rotation of the backrest frame 134, which can facilitate folding of the backrest frame 134 during collapse of the infant stroller apparatus 100.

Advantages of the structures described herein include the ability to provide a release actuator at a desirable position, which is operable to unlock the stroller frame and the backrest frame in a concurrent manner for convenient and easy collapse of the infant stroller apparatus with one hand.

Realization of the infant stroller apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. An infant stroller apparatus comprising:
   a first and a second leg segment respectively affixed with a first and a second coupling member, the first and second coupling members being pivotally connected with each other;
   a handle segment affixed with a third coupling member, the third coupling member being pivotally connected with the first coupling member;
   a latch assembled with the second coupling member, the latch being movable relative to the second coupling member to engage with the third coupling member to lock the handle segment and the first and second leg segments in an unfolded state, wherein the latch is connected with a driving part, the driving part being slidably assembled with the second coupling member, the driving part sliding relative to the second coupling member to drive rotation of the latch to engage with or disengage from the third coupling member;
   a backrest frame pivotally connected with the second leg segment about a pivot axis; and
   a release actuator connected with the driving part and pivotally connected with the second leg segment about the pivot axis of the backrest frame, the release actuator further being operatively connected with the latch, wherein the release actuator is rotatable to cause the latch to disengage from the third coupling member for allowing folding of the handle segment and the first and second leg segments.

2. The infant stroller apparatus according to claim 1, wherein the release actuator includes a transversal bar extending from a left to a right side of the infant stroller apparatus, and an operating handle affixed with the transversal bar.

3. The infant stroller apparatus according to claim 2, wherein the transversal bar pivotally supports the backrest frame.

4. The infant stroller apparatus according to claim 1, wherein the release actuator is connected with the driving part via a wire, the release actuator being rotatable relative to the second leg segment to urge the driving part to slide in a first direction for causing the latch to disengage from the third coupling member.

5. The infant stroller apparatus according to claim 4, wherein the driving part is further biased by a spring in a second direction for causing the latch to engage with the third coupling member.

6. The infant stroller apparatus according to claim 1, wherein the backrest frame is affixed with a coupling shell that is pivotally connected with the second leg segment, and the release actuator is assembled through the coupling shell.

7. The infant stroller apparatus according to claim 1, further including a second latch operable to lock the backrest frame with respect to the second leg segment, and the release actuator is rotatable to drive concurrent unlocking displacements of the two latches.

8. The infant stroller apparatus according to claim 7, wherein the backrest frame is provided with a second release actuator operatively connected with the second latch, the second release actuator being operable independent from the release actuator connected with the second leg segment to drive the unlocking displacement of the second latch.

9. The infant stroller apparatus according to claim 7, wherein the release actuator includes a transversal bar pivotally connected with the second leg segment, and the second latch is slidable along the transversal bar.

10. The infant stroller apparatus according to claim 9, wherein the transversal bar is affixed with a driving portion, the driving portion being rotatable with the transversal bar to push the second latch to slide along the transversal bar for unlocking the backrest frame.

11. The infant stroller apparatus according to claim 1, wherein the latch and the first coupling member are pivotally connected with the second coupling member about a same pivot axis.

12. The infant stroller apparatus according to claim 1, wherein the first leg segment is a front leg segment, and the second leg segment is a rear leg segment.

13. The infant stroller apparatus according to claim 1, wherein the second coupling member includes two sidewalls, and the latch and the first and third coupling members are received at least partially in a gap between the two sidewalls of the second coupling member.

14. An infant stroller apparatus comprising:
a first and a second leg segment respectively affixed with a first and a second coupling member, the first and second coupling members being pivotally connected with each other about a first pivot axis, and the second coupling member including two sidewalls and being affixed with a shaft portion;
a handle segment affixed with a third coupling member, the third coupling member being pivotally connected with the first coupling member about a second pivot axis spaced apart from the first pivot axis, and the third coupling member further having a guide slot spaced apart from the second pivot axis, the shaft portion of the second coupling member being guided for relative sliding displacement along the guide slot; and
a latch assembled with the second coupling member, the latch and the first and third coupling members being received at least partially in a gap between the two sidewalls of the second coupling member, and the latch being movable relative to the second coupling member to engage with the third coupling member to lock the handle segment and the first and second leg segments in an unfolded state.

15. The infant stroller apparatus according to claim 14, wherein the latch and the third coupling member are received at least partially in a space delimited between the first coupling member and one of the two sidewalls.

16. The infant stroller apparatus according to claim 14, wherein the latch is pivotally connected with the second coupling member about the first pivot axis.

17. The infant stroller apparatus according to claim 14, wherein the first leg segment is a front leg segment, and the second leg segment is a rear leg segment.

18. The infant stroller apparatus according to claim 14, wherein the latch is connected with a driving part, the driving part being slidably connected with the second coupling member, the driving part sliding relative to the second coupling member to drive rotation of the latch to engage with or disengage from the third coupling member.

19. The infant stroller apparatus according to claim 18, further including:
a release actuator pivotally connected with the second leg segment about a third pivot axis extending from a left side to a right side of the infant stroller apparatus, the release actuator being connected with the driving part via a wire, the release actuator being rotatable relative to the second leg segment to urge the driving part to slide in a first direction for causing the latch to disengage from the third coupling member.

20. The infant stroller apparatus according to claim 19, wherein the driving part is further biased by a spring in a second direction opposite to the first direction for causing the latch to engage with the third coupling member.

21. The infant stroller apparatus according to claim 19, wherein the release actuator includes a transversal bar having an end that is pivotally connected with the second leg segment, the end of the transversal bar being connected with the wire.

22. The infant stroller apparatus according to claim 21, wherein the transversal bar is affixed with an operating handle arranged at a central location between the left and right side.

23. The infant stroller apparatus according to claim 19, further including a backrest frame pivotally connected with the second leg segment at a location adjacent to the release actuator.

24. The infant stroller apparatus according to claim 23, wherein the backrest frame is affixed with a coupling shell that is pivotally connected with the second leg segment, and the release actuator is assembled through the coupling shell.

25. The infant stroller apparatus according to claim 24, further including a second latch operable to engage with the coupling shell to lock the backrest frame with respect to the second leg segment, and the release actuator is rotatable to drive concurrent unlocking displacement of the two latches.

26. An infant stroller apparatus comprising:
a first and a second leg segment respectively affixed with a first and a second coupling member, the first and second coupling members being pivotally connected with each other;
a handle segment affixed with a third coupling member, the third coupling member being pivotally connected with the first coupling member;
a backrest frame pivotally connected with the second leg segment;
a first latch assembled with the second coupling member, the first latch being movable to engage with the third coupling member to lock the handle segment and the first and second leg segments in an unfolded state;
a second latch operable to lock the backrest frame with respect to the second leg segment; and
a release actuator pivotally connected with the second leg segment, the release actuator being rotatable to drive concurrent unlocking displacements of the first and second latches for folding the infant stroller apparatus.

27. The infant stroller apparatus according to claim 26, wherein the release actuator includes a transversal bar extending from a left to a right side of the infant stroller apparatus, and an operating handle affixed with the transversal bar.

28. The infant stroller apparatus according to claim 27, wherein the transversal bar pivotally supports the backrest frame.

29. The infant stroller apparatus according to claim 27, wherein the second latch is slidable along the transversal bar.

30. The infant stroller apparatus according to claim 29, wherein the transversal bar is affixed with a driving portion, the driving portion being rotatable with the transversal bar to push the second latch to slide along the transversal bar for unlocking the backrest frame.

31. The infant stroller apparatus according to claim 26, wherein the first latch is connected with a driving part, the driving part being assembled adjacent to the second coupling member and connected with the release actuator via a wire, the driving part sliding relative to the second coupling member to drive rotation of the first latch to engage with or disengage from the third coupling member.

* * * * *